United States Patent
Dagh et al.

(10) Patent No.: US 6,257,674 B1
(45) Date of Patent: Jul. 10, 2001

(54) WHEEL HUB FOR A VEHICLE WHEEL

(75) Inventors: Ingemar Dagh, Gothenburg; Anders Carlson, Torslanda, both of (SE)

(73) Assignee: Volvo Lastvagnar AB, Gothenburg (SE)

( * ) Notice: Subject to any disclaimer, the term of this patent is extended or adjusted under 35 U.S.C. 154(b) by 0 days.

(21) Appl. No.: 09/202,526

(22) PCT Filed: Jun. 16, 1997

(86) PCT No.: PCT/SE97/01055

§ 371 Date: Jan. 12, 1999

§ 102(e) Date: Jan. 12, 1999

(87) PCT Pub. No.: WO97/48566

PCT Pub. Date: Dec. 24, 1997

(30) Foreign Application Priority Data

Jun. 17, 1996 (SE) ..................................... 9602386

(51) Int. Cl.[7] ........................... B60B 19/10; B60B 27/00; F16D 65/78
(52) U.S. Cl. .................... 301/6.3; 301/105.1; 188/264 A
(58) Field of Search ................................. 301/6.3, 105.1, 301/6.1, 6.7, 6.8, 6.91; 188/264 A, 264 AA

(56) References Cited

U.S. PATENT DOCUMENTS

| 880,266 | * | 2/1908 | Ast | 188/264 A |
|---|---|---|---|---|
| 2,022,153 | * | 11/1935 | Rogers | 188/264 A |
| 2,687,192 | * | 8/1954 | Butterfield | 188/264 A |
| 2,809,318 | * | 10/1957 | Lyon | 301/105.1 |
| 3,168,348 | * | 2/1965 | Fleming et al. | 188/264 A |
| 3,734,247 | * | 5/1973 | Buckley | 188/264 A |
| 4,013,146 | * | 3/1977 | Gebhardt et al. | 188/264 A |
| 4,135,764 | * | 1/1979 | Johnson et al. | 188/264 AA |
| 4,620,616 | * | 11/1986 | Martin | 188/264 A |
| 5,215,168 | * | 6/1993 | Guiot et al. | 188/264 A |
| 5,772,285 | * | 6/1998 | Bigley et al. | 301/105.1 |
| 6,056,089 | * | 5/2000 | Karlsson et al. | 188/264 A |

FOREIGN PATENT DOCUMENTS

WO 93/14946   8/1993   (WO).

* cited by examiner

Primary Examiner—S. Joseph Morano
Assistant Examiner—Long Bao Nguyen
(74) Attorney, Agent, or Firm—Young & Thompson

(57) ABSTRACT

Wheel hub for a vehicle wheel, comprising a bearing portion (1) with bearing seats (5, 6), a rim mounting flange (2) and a carrier portion (3) for a brake disc (20). The bearing portion and the carrier portion are joined to each other in such a way that an annular gap (15) is formed between them. The annular gap is open at one end and communicate with channels (22) which open in a root portion (11) of the mounting flange.

12 Claims, 1 Drawing Sheet

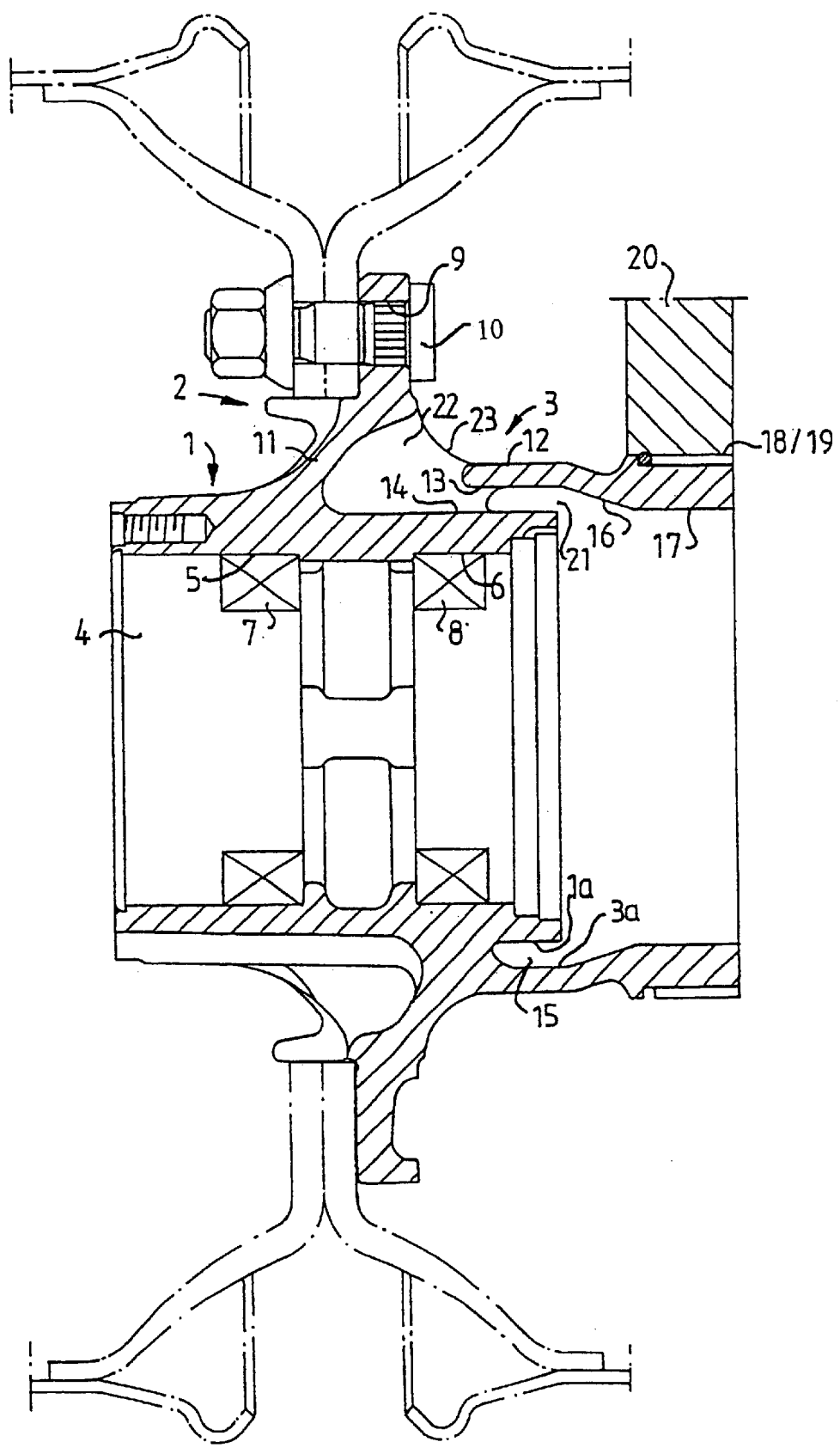

WHEEL HUB FOR A VEHICLE WHEEL

The present invention relates to a wheel hub for a vehicle wheel, comprising a bearing portion with an interior cylindrical opening, in which seats for bearing means are arranged, and a carrier portion which has means for non-rotatable mounting of a brake disc and which is joined to the bearing portion so that an annular gap open at one end of the hub is formed between an exterior cylindrical surface on the bearing portion and interior cylindrical surface on the carrier portion.

Disc brakes in trucks of the heaviest class, where the maximum braking torque is on the order of 20,000 Nm, produce extremely elevated temperatures in the brake discs. It is important to limit as much as possible the heat transfer from the disc via the hub to the components lying thereinside, which must not be subjected to heat expansion, for example, the hub bearing means.

SE-A-469 687 reveals as previously known a wheel hub of the type described by way of introduction, in which the annular gap limits the heat transfer to components lying radially thereinside by creating an axial heat transfer path and thereby substantially extending the path through the metal material from the brake disc to the bearings as compared to a solid hub in which the heat transfer path is entirely radial.

The purpose of the present invention is to farther develop such a previously known wheel hub to additionally reduce the heat transfer from the brake disc to the bearing portion with bearing seats of the wheel hub.

This is achieved according to the invention by virtue of the fact that the annular gap communicates with channels opening in a surface radially outside said bearing seats.

In the above described known design, the annular gap is only open towards one end of the hub, which means that there will be very limited air exchange in the annular gap. During braking, the air in the annular gap is heated and a certain radial heat transfer from the air in the gap to the bearing seats in the hub portion will thus be unavoidable even if it is substantially less than if the heat transfer could occur radially through the metal material. By arranging, in accordance with the invention, channels which communicate with the annular gap and which open into the surrounding air, free air passage is achieved from an inlet to an outlet and greatly increased air exchange in the annular gap, which improves the cooling of the bearing portion of the hub.

In a preferred embodiment of the hub according to the invention, outside of the bearing portion is made integral with an annular mounting flange, having through-holes for rim bolts and having a root portion with a cross-sectional profile which gradually widens and has a gentle transition to the external lateral surface of the bearing portion. The channels communicating with the annular gap extend through the root portion and open into the open air.

By arranging the channels in the widened root portion of the mounting flange, the flow-through area of the channels can be greater than if the channels were directed radially straight out through a portion of smaller thickness, such as the cylindrical portion of the bearing portion of the hub.

The invention will be described in more detail below with reference to an example shown in the accompanying drawing, where the figure shows a longitudinal section through one embodiment of a wheel hub according to the invention.

The hub is cast in one piece and consists of three main portions, viz., a cylindrical bearing portion 1, a disc-shaped rim mounting flange 2 and a cylindrical support portion 3 for a brake disc. The bearing portion 1 has an interior cylindrical through-opening 4, in which the seats 5 and 6, respectively, for a pair of conical roller bearings 7 and 8, respectively, are disposed The mounting flange 2 has evenly distributed peripheral holes 9 for rim bolts 10 and has a transitional root portion 11 with gradually widening cross-section profile to the bearing portion 1. The hub in the example is a hub for double rims which are indicated by the dash-dot lines.

A supporting portion, generally designated 3, has a first cylindrical portion 12, which has a cylindrical opening 13 of greater inner diameter than the outer diameter of the adjacent portion 14 of the bearing portion 1. The support portion overlaps the portion 14 forming an annular gap 15 between the inner surface 3a of the supporting portion 3 and the outer surface 1a of the bearing portion 1. The cylindrical portion 12 of the supporting portion 3 becomes at one end the root portion 11 of the mounting flange 2 and becomes at its other end a conical portion 16 which in turn becomes a cylindrical portion 17, the exterior lateral surface of which is provided with splines 18 which engage corresponding internal splines 19 on a brake disc 20.

The annular gap 15 has an annular opening 21 at its end facing the brake disc 20. At its opposite end, the annular gap 15 communicates with channels 22 which extend through the root portion 11 of the mounting flange 2 and have openings 23 in the surface of the root portion 11. For example, the annular gap 15 can be in communication with five peripherally evenly spaced channels 22, the rotational dimension of which is somewhat larger than e radial dimension. It has been demonstrated that such an arrangement provides a very effective air exchange in the annular gap, which contributes to appreciably reducing the heat transfer to the bearing seats as compared to the known design described in the introduction.

What is claimed is:

1. Wheel hub for a vehicle wheel, comprising a bearing portion (1) with an interior cylindrical opening (4), in which seats (5,6) for bearing means are arranged, and a carrier portion (3) which has means (18) for non-rotatable mounting of a brake disc (20) which is joined to the bearing portion (1) so that an annular gap (15) open at one end of the hub is formed between an exterior cylindrical surface (1a) on the bearing portion and interior cylindrical surface (3a) on the carrier portion, characterized in that the annular gap (15) communicates with channels (22) which open into a surface radially outside said bearing seats (5,6).

2. Wheel hub according to claim 1, characterized in that the bearing portion (1) is joined on its exterior with an annular mounting flange (2) with peripherally spaced holes (9) for rim bolts and in that the channels (22) open into a surface on the mounting flange (2).

3. Wheel hub according to claim 1, characterized in that the mounting flange (2) is integral with the bearing portion (1).

4. Wheel hub according to claim 3, characterized in that the mounting flange (2) has a root portion (11) with a cross-sectional profile which gradually widens and A,is a gentle transition to an exterior lateral surface of the bearing portion, and in that the channels (22) extend through the root portion.

5. Wheel hub according to claim 1, characterized in that the means of the carrier portion (3) for non-rotatably mounting a brake disc (20) are formed of external splines (18) which are located axially outside the annular gap (15).

6. Wheel hub according to claim 2, characterized in that the mounting flange (2) is integral with the bearing portion (1).

7. Wheel hub according to claim 2, characterized in that the means of the carrier portion (3) for non-rotatably mounting a brake disc (20) are formed of external splines (18) which are located axially outside the annular gap (15).

8. Wheel hub according to claim 3, characterized in that the means of the carrier portion (3) for non-rotatably mounting a brake disc (20) are formed of external splines (18) which are located axially outside the annular gap (15).

9. Wheel hub according to claim 4, characterized in that the means of the support portion (3) for non-rotatably mounting a brake disc (20) are formed of external splines (18) which are located axially outside the annular gap (15).

10. The wheel hub of claim 1, wherein the means for non-rotatable mounting of the brake disc is arranged so that the brake disk, when mounted, is located entirely inboard of a furthest inboard extent of the bearing portion.

11. Wheel hub for a vehicle wheel, comprising:

a bearing portion having an interior cylindrical opening with bearing means disposed therein; and a carrier portion comprising means for non-rotatable mounting of a separate brake disc, the carrier portion being joined to the bearing portion so that an annular gap is formed between an exterior cylindrical surface on the bearing portion and an interior cylindrical surface on the carrier portion, the carrier portion and means for non-rotatable mounting of the separate brake disc being arranged so that the brake disc, when mounted, is entirely inboard of a furthest inboard extent of the bearing portion;

wherein the annular gap communicates with channels which open onto a surface radially outside said bearing seats.

12. The wheel hub of claim 11, wherein each of the channels is located entirely outboard of the disc when the disc is mounted.

* * * * *